United States Patent
Gee

(10) Patent No.: US 7,513,538 B1
(45) Date of Patent: Apr. 7, 2009

(54) DEVICE FOR CONNECTING TWO METAL PIPES

(76) Inventor: Anthony F. Gee, 6069 Thackeray Dr., Tallahassee, FL (US) 32309

(*) Notice: Subject to any disclaimer, the term of this patent is extended or adjusted under 35 U.S.C. 154(b) by 77 days.

(21) Appl. No.: 11/511,382

(22) Filed: Aug. 28, 2006

(51) Int. Cl.
  *F16L 23/00* (2006.01)
(52) U.S. Cl. .................. 285/406; 285/416; 285/419; 29/525.02
(58) Field of Classification Search .......... 285/416, 285/419, 367, 364, 373, 70, 66, 288.5, 288.6, 285/67, 72, 288.1, 406; 403/312, 313, 310, 403/2, 188; 256/69, 64, 65.1, 65.04, 65.05, 256/65.06, 65.14, 13.1, 65.15; 29/463, 525.14, 29/890.14, 525.02
See application file for complete search history.

(56) References Cited

U.S. PATENT DOCUMENTS

| | | | | |
|---|---|---|---|---|
| 812,162 | A * | 2/1906 | Bemis | 285/419 |
| 1,034,338 | A * | 7/1912 | Beatty | 403/175 |
| 1,796,353 | A * | 3/1931 | Williams et al. | 403/188 |
| 2,578,228 | A * | 12/1951 | Clark | 52/726.3 |
| 2,828,841 | A * | 4/1958 | Weeks | 52/637 |
| 2,888,072 | A * | 5/1959 | Nicholas | 160/377 |
| 3,127,870 | A * | 4/1964 | Bieber | 119/422 |
| 3,406,987 | A * | 10/1968 | Hunder et al. | 403/11 |
| 3,820,906 | A * | 6/1974 | Katt | 403/2 |
| 3,820,909 | A * | 6/1974 | Schindler et al. | 403/205 |
| 3,846,030 | A * | 11/1974 | Katt | 403/2 |
| 5,208,569 | A * | 5/1993 | Michelangelo et al. | 333/257 |
| 5,480,121 | A * | 1/1996 | Rice et al. | 403/2 |
| 6,729,607 | B2 * | 5/2004 | Alberson et al. | 256/13.1 |

FOREIGN PATENT DOCUMENTS

DE  3235489 A1 * 3/1984

* cited by examiner

*Primary Examiner*—David E Bochna
(74) *Attorney, Agent, or Firm*—Pryor Cashman LLP; Andrew S. Langsam; Barry E. Negrin

(57) ABSTRACT

Couplers for coupling or joining metal tubing are provided which develop the full-strength structural connection between two sections of the metal tubing. In this manner, the full capacity of the adjacent tubes is developed in compression, tension and bending. A first coupler includes a half-shell, central portion surrounding and welded to approximately half of an outside dimension (in the case of a round tube, the circumference) of a first tube, and a pair of outwardly extending flanges. The first coupler is mounted on a first side of the first tube such that it extends beyond the end of the first metal tube. A second coupler is mounted on an opposing side of the second metal tube in a similar manner. The first coupler and the second coupler are then bolted together by joining the lengths of the flanges to thereby connect the first tube with the second tube. Each coupler may be seam welded to its tube at a proximal portion of its flanges.

14 Claims, 4 Drawing Sheets

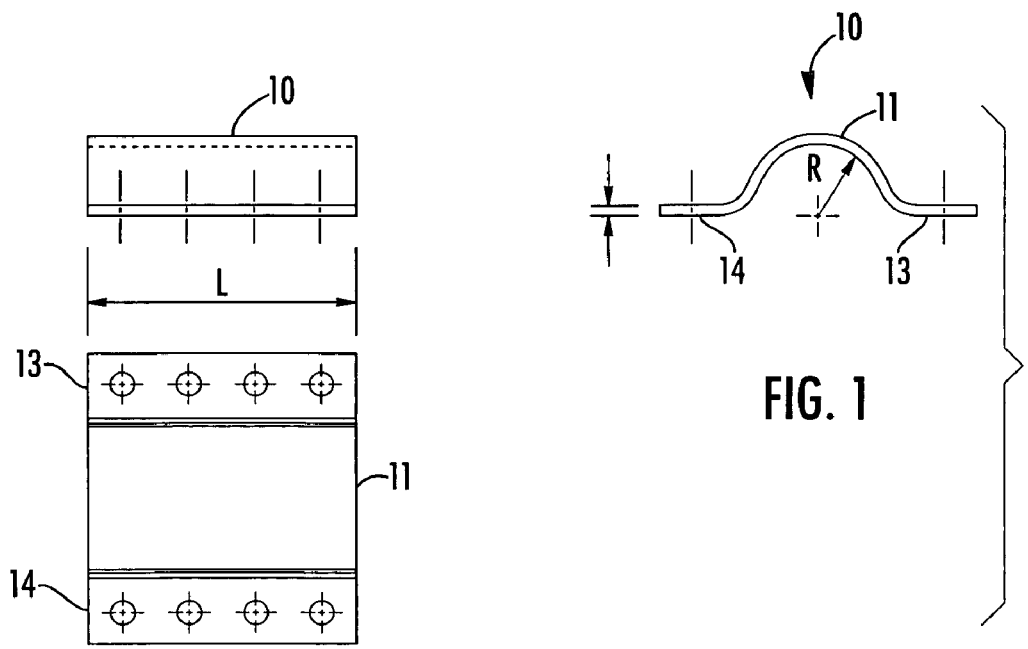
FIG. 1
FIG. 2A
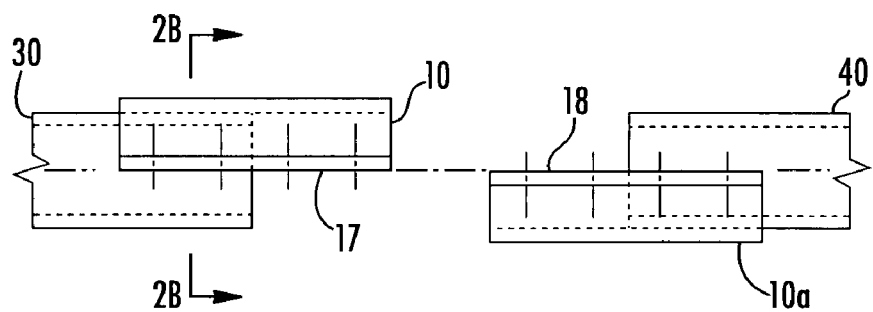
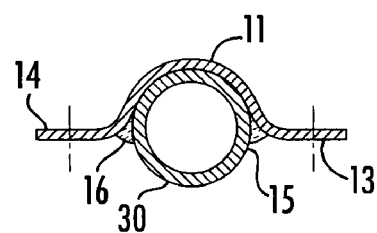
FIG. 2B

DEVICE FOR CONNECTING TWO METAL PIPES

FIELD OF THE INVENTION

The present invention relates to the field of metal pipes or other metal tubing and pipe and tube connectors, joiners and couplers, and specifically to connectors, joiners and couplers that connect two lengths of metal pipes of similar external diameter. Preferably but not necessarily the present invention will be used to connect two pieces of metal pipe having the same external and internal diameter, but the invention can also have applicability with metal pipe connections having the same external diameter with different internal diameters (different wall thicknesses). The present invention can also be used for connecting together pipes or non-circular cross-section, as, for example, square or rectangular tubes or pipes. The thrust of the invention is to provide a full-strength structural connection between the two sections of metal tubing, full strength meaning that the connection develops the full capacity of the adjacent tubes in compression, tension and bending. The structural connection is not necessarily air nor fluid tight and thus not suitable for joining pipes transporting fluids or gasses where leakage is a concern. While the invention could be used for joining metal piping or tubing acting as conduits for electrical, telephone, cabling, etc., there are more suitable conduits and devices available for those cases and full-strength structural connection is not required for those applications.

BACKGROUND OF THE INVENTION

There are many techniques for connecting the ends of two lengths of metal pipes, conduit or tubing (hereinafter sometimes collectively referred to as "tubing"). The essence of the invention relates to providing full-strength structural connection between two pieces of metallic tubing or piping. In this connection, full-strength structural connection refers to developing the full capacity of the joined adjacent tubing in compression, tension and bending. Such connections are required in construction. While the invention is primarily intended to be used in connection with the joining of similar external and internal-diameter pipe or tubular segments, the technology disclosed herein can be put to use in connection with joining metal piping or tubular segments with the same external diameter or dimension (in the case of non-circular piping) but different wall thicknesses (thus different internal diameters or dimensions). Furthermore, the present invention is not restricted to its potential use in wholly tubular structures, for example, it is also capable of being employed in connection with trusses having rolled-section chords and tubular bracing members. However for ease of understanding, the invention will be described in connection with round pipes and tubing, it being understood by the reader that the same concept and invention can be employed in connection with square, rectangular or other shaped tubing or piping. Clearly, however, the portion of the device which is in contact with the outside wall of the tubing must conform and be laid upon the dimension and shape of the tube/piping sought to be joined. For illustration purposes, the invention is principally shown and described in connection with round pipes to be joined and, yet, is illustrated in connection with coupling a pair of square-shaped pipes, in FIG. 5.

Among the unique features of the invention, apart from its ability to provide a full-strength connection in compression, tension and bending are: all welding is carried out at the location of fabrication; all welding consists of simple downhand fillet welds; no site welding is required; site assembly requires only the installation of the connecting nuts and bolts; the loading of the joint, whether it be compression, tension or bending, applies only shear forces to the fillet welds, the preferred action; the loading of the joint, whether it be compression, tension or bending, applies only shear forces to the bolts, again the preferred action; the coupling pieces can be orientated in any direction to facilitate subsequent assembly (this is particularly useful in the case of trusses having tubular bracing members); and in comparison to conventional flange plate connections, the present invention provides significantly greater tolerance in "fit-up" requirements.

As an example of the prior art, U.S. Pat. No. 2,326,941 discloses joints for demountable steel structures, in which the ends of the pipes are enlarged and the couplers are provided with grooves to accept the enlarged ends of the tubes. This requires modification to the normal constant cross-section of the tubes. The approach of this reference involves the sealing off of the ends of the tubes. The present invention, on the other hand, develops the full-strength structural connection between the open-ended tubes in that the full capacity of the adjacent tubes in compression, tension and bending are developed. Also, the integrity of the joint shown in the '941 patent depends largely on the clamping action of the two half-shells 15 holding together the flanges. Further, these half-shells 15 are fairly expensive machined or forged cast pieces, and are typically required to be much thicker and stronger than the tubes themselves. The present invention, on the other hand, is expected to have the welding performed in the fabrication facility, and thus there will be no need for on-site fabrication.

FIG. 4B of the present disclosure illustrates a prior art flange plate 70. FIG. 4A illustrates pipes 30 and 40 connected via two plates of the type of prior art flange plate 70 shown in FIG. 4A, by bolting the flange plates 70, illustrated using bolt locations 71, 72 etc. It can be easily appreciated that the bolts extend along the axial length or direction as the tubular sections and the flanges are secured to the ends of the tubular sections by welding which extends circumferentially around the tubular sections. The fillet welding of the present invention, however, extends along the axial direction of the tubular sections and the bolting of the flanges, as described herein and illustrated in the drawings of the present invention, extend across the longitudinal direction of the tubular segments.

The prior art cast metal or machined flange plates entail more expense, and may involve a bulkier coupling because the flange plates extend radially out from the pipes 30 and 40.

SUMMARY OF THE INVENTION

Couplers for coupling two metal tubes are provided. A first coupler includes a cylindrical half-shell (in the case of coupling round tubes or pipes) or central portion adapted to surround approximately half of an outside circumference of a first metal tube, and a first pair of flanges, such that each flange laterally or radially extends from the cylindrical half shell or central portion. The first coupler is adapted to be fillet welded to the first metal tube or tubular section such that it extends beyond, i.e., longitudinally projects beyond the end of the first metal tube. A second coupler, also comprising a cylindrical half-shell (in the case of coupling round tubes or pipes) and a pair of radially extending flanges is mounted, also by fillet welding, to the outside of the second metallic tube. It, too, extends laterally beyond the end of the metal tube to which it is secured. The projecting half-shell portions and their radially or outwardly extending flanges are oriented in a complementary mating manner. The first coupler and the second coupler are adapted to be coupled by nuts and bolts by joining the first coupler's flanges extending beyond the end of the first metal tube to the flanges of the second coupler secured to the second tubular section and the flanges of the second coupler which extend beyond the end of the tube to which it is welded is secured (also by nuts and bolts) to the flanges of the first coupler secured to the outside of the first metal tube, to thereby couple the first metal tube with the second metal tube to develop a full-strength structural connection.

Each flange of the first coupler's flanges may be disposed to extend radially away from the first metal tube substantially along a plane bisecting a central axis of the first metal tube and each flange of the second coupler's flanges may be adapted to extend radially away from the second metal tube substantially along a plane bisecting a central axis of the second metal tube. The planes within which the flanges of the first and second coupler lie are substantially co-planar so that bolts passing through one set of flanges can be passed through and secured to the opposing flanges with nuts on the opposite side of the second set of flanges.

The first coupler may be partially fillet welded to the first metal tube at a proximal portion or seam of each of its flanges with the tube and the second coupler may be partially fillet welded to the second metal tube at a proximal portion or seam of each of its flanges.

Each flange may be secured with nuts and bolts to the corresponding and opposed flange of the other or opposed coupler.

BRIEF DESCRIPTION OF THE DRAWINGS

FIG. 1 is a schematic side view, cross-section and top view of a coupler (two of such couplers are needed for a full-strength structural connection between two metallic, round tubular sections) including its formed central or cylindrical half-shell portion for fitting on the tube and having radially extending flanges on both sides of the half-shell, according to an aspect of the present invention;

FIG. 2A is a schematic illustration of two tubes, each with a coupler attached on top or bottom thereof, respectively, with the couplers extending beyond the end of the tube to which it is fillet welded, according to an aspect of the present invention;

FIG. 2B is a schematic sectional view taken along line A-A of FIG. 2A and showing the first coupler mounted or fillet welded onto the first tube, according to an aspect of the present invention (the fillet welding extends along the longitudinal axis of the coupler and the tubular segment to which it is secured);

DETAILED DESCRIPTION OF THE DRAWINGS AND THE PREFERRED EMBODIMENT OF THE INVENTION

Figure 5:
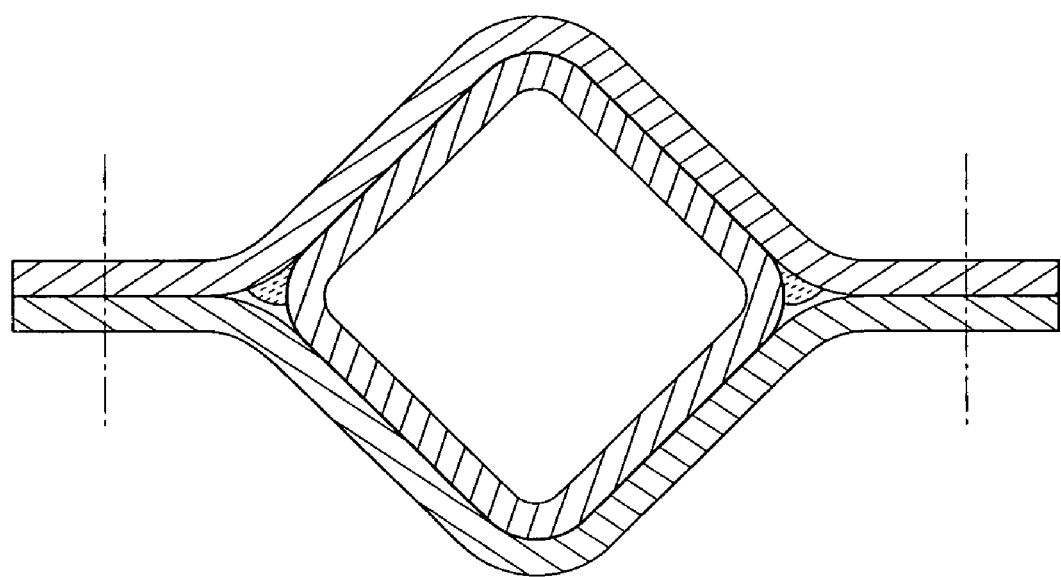
FIG. 5 is a cross-sectional view of the present invention as used in connection with joining a pair of rectangular, here, square, tubular sections.

Embodiments of the present invention will now be described with reference to the above-identified figures of the Drawings. However, the Drawings and the description herein of the invention are not intended to limit the scope of the invention. It will be understood that various modifications of the present description of the invention are possible without departing from the spirit of the invention. Also, features described herein may be omitted, additional features may be included, and/or features described herein may be combined in a manner different from the specific combinations recited herein without departing from the spirit of the invention. As mentioned, the invention is shown and described in connection with the joining of round, tubular sections of pipes and, yet, the invention can be used in connection with joining other shapes as, for example, rectangular or square shaped tubes or piping. However for ease of understanding, the invention will be described in connection with round pipes and tubing, it being understood by the reader that the same concept and invention can be employed in connection with square, rectangular or other shaped tubing or piping. Clearly, however, the portion of the device which is in contact with the outside wall of the tubing must conform and be laid upon the dimension and shape of the tube/piping sought to be joined. For illustration purposes, the invention is shown in FIG. 5 connection with coupling a pair of square-shaped pipes.

FIG. 1A shows a coupler 10 to be joined to a first, round metal tube section 30 or to its end. The first coupler 10 includes a hump, cylindrical half-shell, or central portion 11 that is adapted to be shaped precisely to surround approximately half of the outer round or circumference of the round, metal tube segment 30. The coupler 10 has a pair of oppositely directed flanges 13 and 14, such that one flange extends radially out on both sides from the cylindrical half-shell or the central portion 11. FIG. 1 also shows a cross-sectional view of the coupler 10 with the cylindrical half-shell, hump or central portion 11 shaped to surround approximately one-half of the outer cylindrical circumference of the round, metal tube segment 30, R being approximately equal to the outside radius of the tube segment extending from the central axis of the metal tube 30 to the inner periphery of its wall. Typically, since the coupler 10 will be seam or fillet welded to the tube 30, a snug fit around the outer wall of the tube 30 is desired. The thickness "T" of the wall of the coupler 10 is preferably equal or substantially equal to the thickness of the wall of the tube 30. The inside diameter of the coupler is substantially the same as the outside diameter of the tubular segment 30.

According to an aspect of the present invention, the coupler 10 can be made of sheet-metal and may be of the same or different metal as the tube 30. The first and second couplers 10 and 10a, respectively, may be made of the same sheet-metal or different sheet-metal. The hump, cylindrical half-shell or central portion 11 of the coupler 10 may be shaped in advance to accommodate specific tube sizes and shapes according to the outer diameter (O.D.), outside dimensions or outer radius of the tube 30. Preferably, the couplers and tubular segments are fabricated and secured to the tubular segments to be joined together at one location, the fabrication shop. This eliminates the labor and other costs of on-site fabrication. Alternatively, the coupler 10 may be flat and shaped at the work site to fit snugly around the outer circumference or surface of the tubes 30 and 31 as needed for a particular job.

FIG. 2B is a sectional view of the hump, cylindrical half-shell or central portion 11 of the coupler 10, which is shaped to fit snugly over the tube 30 to cover approximately half of the outside circumference of the tube 30. Flanges 13 and 14 of the coupler 10 extend laterally or radially out in both directions, from the cylindrical half-shell or central portion 11, and as central portion 11 covers approximately half of the outer circumference of the tube 30, then the flanges 13 and 14 will be positioned to geometrically bisect the tube 30, along the axis at the center of the tube 30, as shown in FIG. 2B. In the process of joining or coupling the two metal tubes 30 and 40 to be joined, a first coupler 10 is positioned around tube 30 such that the hump, cylindrical half-shell or central portion 11 of the coupler 10 surrounds a top portion of the tube 30 and extends longitudinally beyond the end of the tube 30 as shown in FIG. 2A. FIG. 2B is a sectional view of the first coupler 10 and tube 30 along a section taken at line A-A of FIG. 2A.

FIG. 2B (and FIG. 5) also shows the seams or weld seams 15 and 16 (fillet welds) at which the coupler 10 is welded to the tube 30 along the seam or near the points (proximal portions of the flanges) at which the flanges 13 and 14 of the coupler 10 join the cylindrical (and square) half-shell or central portion 11 on the sides of the tube 30. It will be understood however, that the coupler 10 may be welded to the tube 30 at specific points in addition to or in lieu of a continuous welded seam 15 and 16, or lengthwise sections can be formed between the coupler and the tubular segment. Also, methods other than fillet welding or soldering may be used to adhere or join the coupler 10 to the metal tube 30. The coupler 10 is welded to the tube 30 at fillet weld seams 15 and 16, as shown in FIGS. 2B and 5.

It will be understood that weld seams 15 and 16 represent lines along both sides of the tube 30, and they preferably extend along the entire length of the coupler which overlays the outer wall of tube 50. Alternatively, the welding may be performed at selected points along the weld lines or seams.

FIG. 2A shows a portion of the first coupler 10 extending beyond the end of the tube 30. It is placed for illustrative purposes, on "top" of the tube 30. Matingly, i.e., on the bottom of the opposed tube segment sought to be coupled to the first tube, a second coupler 10a is shown on the right side of FIG. 2A. The second coupler 10a extends beyond the end of tube 40, but here it is seam or fillet welded to the "bottom" of tube 40. According to the preferred embodiment, at least one-half of the length of the couplers 10 and 10a is welded to its respective tube 30 or 40. However, more or less than one-half of the coupler's overall length may extend beyond the end of the tube to which the coupler is secured. The first coupler 10 and the second coupler 10a may be identical with each other and may be mounted on their respective tubes and welded in the same ways or in different ways.

Figure 3A:
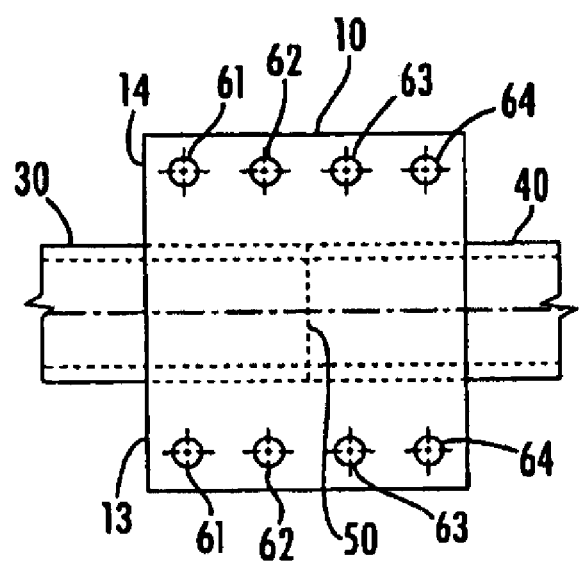
FIG. 3A is a schematic top view of the two couplers, fillet welded to their respective tubular segments, complementarily positioned on the joined tubes, with nuts and bolts securing the opposed flanges of the couplers to develop a full-strength, structural connection, according to an aspect of the present invention.
Figure 3B:
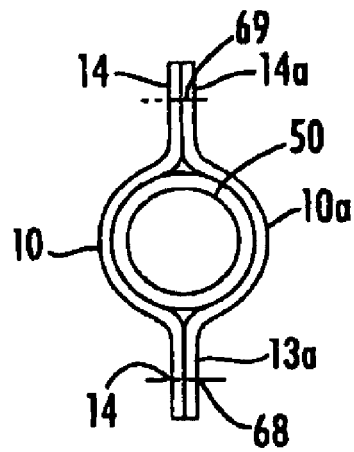
FIG. 3B is cross-sectional view of the two tubes connected together with the couplers as shown in FIG. 3A, according to an aspect of the present invention.
Figure 4A:
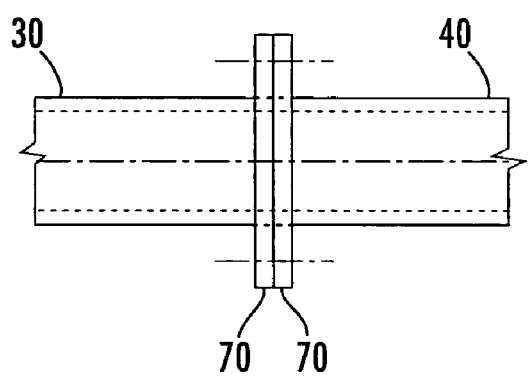
FIG. 4A schematically illustrates two tubes connected via flange plates, according to the related art.
Figure 4B:
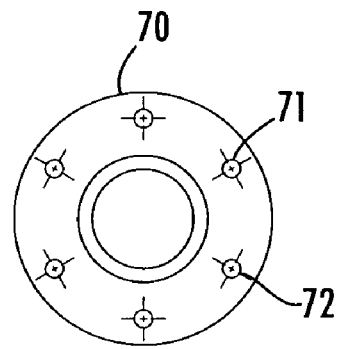
FIG. 4B schematically illustrates a flange plate of the type shown in FIG. 4A, according to the related art.

The couplers are oriented on their tubes to be joined together along their flanges, both at the portions at which they extend beyond the end of the tubes 30 and 40 and at the portions alongside the tubes. The forward section 17 of coupler 10 is the portion of its flanges 13 and 14 that extends beyond the end of the tube 30 to which it is mounted. Similarly, the forward section 18 of coupler 10a is the portion of its flanges that extends beyond the end of the tube 40 to which it is mounted. Forward sections 17 and 18 are bolted (using bolts and nuts) or otherwise affixed to the mating (and rear) flange surfaces of the opposed coupler, as shown in FIGS. 3A and 3B. The rear sections of the couplers are those portions which have been welded, preferably by fillet welding, to their respective metal pipe segments.

FIG. 3A is a top view of the tube segments 30 and 40 and the couplers 10 and 10A after the coupling is complete. The tubes 30 and 40 are joined along their ends at line 50, when the first coupler 10 and the second coupler 10a are bolted, screwed or otherwise affixed along their flanges 13 of 14 to the corresponding flanges of the opposed coupler. FIG. 3A also shows the points 51, 52, 53 and 54 along flange 13 and points to 61, 62, 63 and 64 along flange 14 at which the first coupler 10 is joined (by nuts and bolts passing through appropriate and aligned holes in the flanges) with the second coupler 10a. However, the couplers may also be affixed in other ways along lines on the flanges 13 and 14 instead of at specific and indicated aligned points for the nuts and bolts, as shown in FIG. 3A, 51, 52, 53, 54, 61, 62, 63 and 64. Also, a greater or smaller number of points may be used to bolt the flanges. For example, for wider or heavier tubes, longer couplers may be used to increase the length of the flanges along which the flanges can be bolted together.

FIG. 3B is a cross-sectional view of the coupling along line 50. The first coupler 10 and the second coupler 10a are joined together at their flanges along spots 51-53 and 61-64. When the coupling is well proportioned, the joint develops the full strength of each tube with respect to tension, compression and bending. This is considered a full-strength structural connection between the pipe or tube segments. Similarly, the number and size of bolts securing the two couplers along spots 51-53 and 61-64 are selected to maximize the strength of the coupling, for example to achieve a coupling with the strength of the tube. Each bolt may contribute to the strength of the coupling. The bolts act in pure shear and are not subjected to any tension.

Accordingly, a less expensive full strength coupling with couplers made of relatively inexpensive sheet-metal is provided for metal tubing segments. This invention is intended to be used in the construction industry. Also, it will be appreciated that the invention is not restricted to wholly tubular structures; for example, it is particularly appropriate for use in trusses having rolled-section chords and tubular bracing members. The foregoing description is not intended to limit the scope of the invention.

The considered unique features of the invention, apart from its ability to provide a full-strength connection in compression, tension and bending, are: all welding (preferably fillet welding) is carried out in the fabrication shop; correspondingly, no fabrication need be done on the site of the construction; all welding consists of simple downhand fillet welds; the site assembly is limited to only the installation of bolts and connections by nuts; the loading of the joint, whether it be in compression, tension or bending, applies only shear forces to the fillet welds, the preferred action; the loading of the joint, whether it be in compression, tension, or bending, applies only shear forces to the bolts, again the preferred action; the coupling pieces can be orientated in any direction to facilitate subsequent assembly (this is particularly useful in the case of trusses having tubular bracing members); and, in comparison to conventional flange plate connections, it provides significantly greater tolerance in "fit-up" requirements.

What is claimed is:

1. A mechanical coupling mechanism for coupling two metal tubes end to end, comprising:

a first coupler including a first central, half-shell portion adapted to surround approximately half of an outside dimension of a first metal tube of said two metal tubes to be coupled end to end, and a first pair of flanges, each flange of said first pair of flanges outwardly extending from said first central, half-shell portion, said first coupler being secured to a first side of said first metal tube yet of sufficient length to extend beyond a first end of said first metal tube;

a second coupler including a second central, half shell portion adapted to surround approximately half of an outside dimension of a second metal tube of said two metal tubes to be coupled end to end, and a second pair of flanges, each flange of said second pair of flanges outwardly extending from said second central, half shell portion, said second coupler being secured to said second metal tube and of sufficient length to extend beyond a second end of said second metal tube; and said first coupler adapted to be joined to said second coupler by joining said first pair of flanges to said second pair of flanges to thereby couple and develop a full-strength structural connection between said first metal tube and said second metal tube with said first end of said first metal tube abutting said second end of said second metal tube, wherein said first coupler and said second coupler are fillet welded to said first metal tube and said second metal tube, respectively, at a seam formed between a portion of each flange of said pair of flanges and said respective tubes.

2. The mechanism of claim 1, wherein said first central, half-shell portion and said second central, half-shell portion are substantially semi-cylindrical in shape, said the internal diameters of said first and second central, half-shell portions corresponding to said outside dimension/diameter of the first and the second metal tubes.

3. The mechanism of claim 1, wherein each flange of said first pair of flanges extends outwardly away from said first metal tube substantially along a plane bisecting a central axis of said first metal tube and each flange of said second pair of flanges extends outwardly away from said second metal tube, substantially along a plane bisecting a central axis of said second metal tube.

4. The mechanism of claim 1, wherein said joining of each flange of said first coupler to said corresponding flanges of said second coupler is by bolts and coupling nuts passing through spaced holes in said flanges.

5. The mechanism of claim 1, wherein the thickness of said first coupler and said second coupler is approximately equal to the thickness of the wall of said metal tubes.

6. The mechanism of claim 1, wherein a length of said first coupler extending beyond said first end of said first metal tube is less than half the length of the first coupler, and a length of said second coupler extending beyond said second end of said second metal tube is less than half the length of the second coupler.

7. The mechanism of claim 1, wherein said first coupler and said second coupler are substantially identical.

8. The mechanism of claim 1, wherein said two metal tubes are round in cross-section.

9. The mechanism of claim 1, wherein said tubes sought to be coupled are rectangular in cross-section.

10. A method of coupling two metal tubes end to end, said method comprising:

joining a first coupler to an outside of a first metal tube of said two metal tubes to be connected end to end, such that said first coupler surrounds approximately half of an outside dimension of said first metal tube, has first flanges such that a flange outwardly extends on both sides of said first metal tube, and extends beyond a first end of said first metal tube to be connected;

joining a second coupler to an outside of a second metal tube of said two metal tubes to be connected end to end, such that said second coupler surrounds approximately half of an outside dimension of said second metal tube, opposed to said first coupler, and has second flanges such that a flange outwardly extends on both sides of said second metal tube, and extends beyond a second end of said second metal tube to be connected; and securing said first coupler to said second coupler by securing said first flanges of said first coupler to said second flanges of said second coupler, thereby coupling said first metal tube with said second metal tube with said first end of said first metal tube abutting said second end of said second metal tube, wherein said joining of said first coupler to said outside of said first metal tube and said joining of said second coupler to said outside of said second metal tube is done by fillet or seam welding.

11. The method of claim 10, further comprising first shaping said first coupler to surround approximately half of the outside dimension of said first metal tube, and shaping said second coupler to surround approximately half of the outside dimension of said second metal tube.

12. The method of claim 10, comprising disposing said flanges of said first and second coupler to extend substantially along opposed planes bisecting said first metal tube and said second metal tube, respectively.

13. The method of claim 10, wherein said securing of said first coupler to said second coupler comprises bolting.

14. The method of claim 13, wherein said bolting comprises bolting said flanges of said first coupler to said flanges of said second coupler.

* * * * *